(12) United States Patent
Okada et al.

(10) Patent No.: US 10,601,014 B2
(45) Date of Patent: Mar. 24, 2020

(54) BATTERY SYSTEM FOR LASER-WELDING A BUSBAR TO ELECTRODE TERMINALS AND CONNECTING BATTERY CELLS IN A LOW RESISTANCE STATE

(71) Applicant: SANYO Electric Co., Ltd., Osaka (JP)

(72) Inventors: Wataru Okada, Hyogo (JP); Yoshihiro Shiotsu, Osaka (JP); Tomomi Tanaka, Hyogo (JP); Seiji Kumazawa, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 20 days.

(21) Appl. No.: 15/541,483

(22) PCT Filed: Nov. 6, 2015

(86) PCT No.: PCT/JP2015/005565
§ 371 (c)(1),
(2) Date: Jul. 5, 2017

(87) PCT Pub. No.: WO2016/157262
PCT Pub. Date: Oct. 6, 2016

(65) Prior Publication Data
US 2017/0365838 A1    Dec. 21, 2017

(30) Foreign Application Priority Data
Mar. 31, 2015  (JP) .................................. 2015-073505

(51) Int. Cl.
*H01M 2/20* (2006.01)
*H01M 2/30* (2006.01)
(Continued)

(52) U.S. Cl.
CPC ........... *H01M 2/20* (2013.01); *H01M 2/1077* (2013.01); *H01M 2/206* (2013.01); *H01M 2/30* (2013.01);
(Continued)

(58) Field of Classification Search
CPC ...... H01M 2/1077; H01M 2/20; H01M 2/206; H01M 2/30; H01M 2220/20; B23K 26/21; B23K 2101/38
See application file for complete search history.

(56) References Cited

U.S. PATENT DOCUMENTS

2009/0223940 A1* 9/2009 Hosoya ................ B23K 15/008
                                                              219/121.64
2011/0064993 A1    3/2011 Ochi
(Continued)

FOREIGN PATENT DOCUMENTS

CN    101018641    8/2007
CN    104466220    3/2015
(Continued)

OTHER PUBLICATIONS

"Fillet Weld." American Welding Society Learning Certified Welding Classes. N.p., n.d. Web. Jan. 24, 2019. (Year: 2019).*
(Continued)

*Primary Examiner* — Stephan J Essex
(74) *Attorney, Agent, or Firm* — Wenderoth, Lind & Ponack, L.L.P.

(57) ABSTRACT

A plurality of battery cells are connected by a busbar. Electrode terminals of the battery cells each include a protruding portion and a welding surface around the protruding portion. The busbar includes a welding plate portion being in surface-contact with the welding surface and having a cut-away portion for guiding the protruding portion, and an exposure gap that exposes the welding surface between the
(Continued)

inner side of the cut-away portion and the protruding portion. The busbar is welded to the welding surface in a predetermined welding width (H) by both of a fillet weld part and a penetration welding portion such that the inner edge of the cut-away portion as the fillet weld part is welded to the welding surface, and the boundary between the busbar and the welding surface is welded by the penetration welding portion.

9 Claims, 6 Drawing Sheets

(51) Int. Cl.
  *H01M 2/10* (2006.01)
  *B23K 26/21* (2014.01)
  *B23K 101/38* (2006.01)
(52) U.S. Cl.
  CPC .......... *B23K 26/21* (2015.10); *B23K 2101/38* (2018.08); *H01M 2220/20* (2013.01)

(56) References Cited

U.S. PATENT DOCUMENTS

| 2012/0009461 | A1* | 1/2012 | Kim | H01M 2/1077 |
| | | | | 429/158 |
| 2015/0079453 | A1* | 3/2015 | Choi | H01M 2/206 |
| | | | | 429/158 |

FOREIGN PATENT DOCUMENTS

| JP | 2011-060623 | | 3/2011 | |
| WO | WO-2014034106 A1 | * | 3/2014 | .......... H01M 2/1077 |

OTHER PUBLICATIONS

Machine translation for WO 2014/034106 A1. (Year: 2019).*
International Search Report of PCT application No. PCT/JP2015/005565 dated Dec. 8, 2015.
English Translation of Chinese Search Report dated Oct. 28, 2019 in Chinese Patent Application No. 201580075899.6.

* cited by examiner

BATTERY SYSTEM FOR LASER-WELDING A BUSBAR TO ELECTRODE TERMINALS AND CONNECTING BATTERY CELLS IN A LOW RESISTANCE STATE

This application is a U.S. national stage application of the PCT International Application No. PCT/JP2015/005565 filed on Nov. 6, 2015, which claims the benefit of foreign priority of Japanese patent application 2015-073505 filed on Mar. 31, 2015, the contents all of which are incorporated herein by reference.

TECHNICAL FIELD

The present invention relates to a battery system including a plurality of battery cells connected in series or in parallel via a busbar, and in particular to a battery system in which a busbar is connected to electrode terminals of battery cells by laser welding.

BACKGROUND ART

In a battery system, a plurality of battery cells can be connected in series to increase an output voltage and in parallel to increase charging and discharging current. For example, a large-current and high-output battery system used as a power source for a motor that drives a vehicle has a plurality of battery cells connected in series to increase an output voltage. In a battery system to be used in this application, a plurality of battery cells is connected by a busbar made of a metal plate. The busbar is connected to electrode terminals of the battery cells constituting the battery system by laser welding. In this connection structure, the busbar is provided with a cut-away portion, and the electrode terminals of the battery cells are inserted into the cut-away portion. A boundary between the inserted electrode terminals and the busbar is irradiated with a laser beam, and both the electrode terminals and the busbar are melted and connected to each other at the boundary therebetween. This connection structure has a problem in that when a gap is generated between the busbar and the electrode terminals to be laser-welded, reliable and stable welding cannot be carried out. This is because metals of both the busbar and the electrode terminals cannot be melted by irradiation with the laser beam. The laser welding is carried out by irradiating the boundary between the busbar and the electrode terminals with a laser beam in a state in which the busbar and the electrode terminals are closely attached to each other so as to weld-join the both metals to each other. However, in a battery system including a plurality of battery cells, it is very difficult to eliminate a gap between a cut-away portion of a busbar and electrode terminals because of a dimensional error in the battery cells and/or the busbar. In the cut-away portion of the busbar, the electrode terminals of adjacent battery cells are inserted, and the battery cells are connected in series or in parallel. Accordingly, at least two electrode terminals of the battery cells are connected to one busbar. An interval between the electrode terminals of the adjacent battery cells varies depending on a dimensional error in the battery cells, and therefore the interval does not become constant. In order to electrically connect electrode terminals whose interval is not constant by one busbar, the busbar absorbs the dimensional error of the battery cells by forming an elongated hole as a cut-away portion into which columnar electrode terminals are to be inserted.

In a structure in which a columnar electrode terminal is inserted into an elongated hole, an entire periphery of the electrode terminal cannot be brought nearer to the inner edge of the elongated hole, and a gap is generated in part. This gap inhibits stable laser welding. In order to prevent this problem, a battery system in which a welding ring is stacked to a busbar, and the welding ring is laser-welded to the electrode terminals and the busbar is developed (see Patent Literature 1).

CITATION LIST

Patent Literature

PTL 1: Japanese Patent Application Unexamined Publication No. 2011-60623

SUMMARY OF THE INVENTION

In a battery system in which electrode terminals of battery cells are laser-welded to a busbar via a welding ring, an inner shape of the welding ring is allowed to be substantially equal to an outer shape of each of the electrode terminals so as to eliminate a gap between an entire periphery of the electrode terminal and an inner edge of the welding ring. Furthermore, the welding ring is stacked on the busbar and laser-welded to the busbar in a state in which a gap between the welding ring and the busbar is reduced. In this structure, the inner edge of the welding ring is laser-welded to each of the electrode terminals, and the outer peripheral edge is laser-welded to the surface of the busbar, so that the electrode terminals are electrically connected to the busbar with the welding ring.

In the above-mentioned connection structure, the welding ring can be laser-welded to the electrode terminals and the busbar, and the busbar can be connected to the electrode terminals of the battery cells. In this welding structure, the inner shape of the welding ring is allowed to be equal to the outer shape of the electrode terminal, and the welding ring can be brought into contact with a surface of the electrode terminal. However, in this welding structure, it is difficult to closely attach the outer peripheral edge of the welding ring to the surface of the busbar in a state in which the inner edge of the welding ring is in contact with the electrode terminal. The inner edge of the welding ring can be allowed to equal to the outer shape of the electrode terminal and brought into contact with the busbar. However, with the decrease of the difference between the inner shape of the welding ring and the outer shape of the electrode terminal, the welding ring cannot be inserted into the electrode terminal smoothly, thus making it difficult to closely attach the welding ring to the surface of the busbar. This is because when the inner shape of the welding ring becomes smaller, the frictional resistance between the inner edge and the electrode terminal becomes larger, and as a result, the welding ring cannot drop by its self-weight and cannot be closely attached to the busbar. In order to closely attach the welding ring to the busbar, when the inner shape of the welding ring is made to be larger, a gap is generated between the busbar and the welding ring. This gap inhibits stable electric connection during laser welding.

The present invention is developed in order to solve the above-mentioned problem. An important object of the present invention is to provide a battery system capable of laser-welding a busbar to electrode terminals stably and reliably and electrically connecting battery cells in a low resistance state while a battery or a busbar with a dimensional error is used.

A battery system of the present invention includes a plurality of battery cells and a busbar laser-welded to electrode terminals of the battery cells and electrically connecting the battery cells. In the battery system, each of the battery cells includes the electrode terminal having a surface including a protruding portion that protrudes from the surface and a welding surface around the protruding portion. The busbar has a welding plate portion that is brought into surface-contact with the welding surface of the electrode terminal. The welding plate portion is provided with a cut-away portion for guiding the protruding portion to an inner side of the cut-away portion. An Exposure gap that exposes the welding surface is provided between the inner side of the cut-away portion and the protruding portion. In the battery system, the busbar is welded by a fillet weld part that welds the inner edge of the cut-away portion to the welding surface of the electrode terminal, and a penetration weld part that welds the boundary with respect to the welding surface of the electrode terminal. The busbar is welded to the electrode terminal in a predetermined welding width (H) by both the fillet weld part and the penetration weld part.

In the above-mentioned battery system, a busbar can be laser-welded to electrode terminals reliably and stability, and battery cells can be electrically connected in a low resistance state, while batteries and a busbar with a dimensional error are used. This is because in the battery system mentioned above, the busbar is provided with a cut-away portion for guiding a protruding portion of the electrode terminal; an exposure gap that exposes the welding surface of the electrode terminal is provided between the cut-away portion and the protruding portion; and the busbar is welded to the electrode terminal by both the fillet weld part and the penetration weld part in a predetermined welding width such that the inner edge of the cut-away portion is welded to the welding surface by the fillet weld part and a facing surface that faces the welding surface of the electrode terminal is welded to the welding surface by the penetration weld part. In particular, in the above-mentioned battery system, the facing surface between the busbar and the welding surface is laser-welded by the penetration weld part. In addition, the inner edge of the cut-away portion of the busbar is laser-welded to the welding surface by the fillet weld part. Since the busbar is laser-welded to the welding surface by the penetration weld part and the fillet weld part in a predetermined width, the busbar can be welded to the electrode terminals reliably and stably so as to prevent the busbar from being detached. Furthermore, in the above-mentioned battery system, the exposure gap is provided between the cut-away portion and the protruding portion, and the inner edge of the cut-away portion is laser-welded to the welding surface of the electrode terminal by the fillet weld part. Therefore, irradiation with laser beam along the inner side of the cut away portion, such that the inner edge of the cut-away portion as the fillet weld part can be laser-welded and fixed to the welding surface of the electrode terminal reliably.

Furthermore, the above-mentioned battery system is provided with an exposure gap that exposes the welding surface between the inner side of the cut-away portion of the busbar and the protruding portion of the electrode terminal. Therefore, in a step of laser-welding the busbar to the welding surface, positions of the welding surface and a surface of the busbar can be detected, so that the busbar can be reliably laser-welded to the welding surface of the electrode terminal. This is because a laser beam or a position-detection sensor for detecting the position of the exposed surface of the electrode terminal can be inserted into the exposure gap, thus enabling the position of the exposed surface to be detected and laser-welded. In a step of stacking the busbar onto the exposed surface of the electrode terminal and laser-welding the busbar to the electrode terminal, when a gap is generated between the busbar and the exposed surface, reliable and stable weld-joining cannot be carried out. This problem can be solved as follows. The positions of the exposed surface of the electrode terminal and the busbar are detected. When a gap is generated between the busbar and the exposed surface, the laser welding is stopped, and the laser welding is carried out in a state in which the busbar is closely attached to the exposed surface. In the above-mentioned battery system, since the position of the exposed surface can be detected in a state in which the exposure gap is provided and the busbar is stacked, the positions of the exposed surface and the busbar can be detected and the busbar can be laser-welded to the exposed surface reliably and stably.

In the battery system of the present invention, the cut-away portion can be a through-hole provided in the busbar.

In the battery system of the present invention, the busbar can be welded to the welding surfaces of the electrode terminals in a predetermined width by the fillet weld part and the penetration weld part by laser-welding at a predetermined pitch (t) in a plurality of lines.

In the above-mentioned battery system, the busbar can be weld-joined to the electrode terminals in a predetermined width by focusing a laser beam into a narrow region and laser-welding the busbar to the electrode terminals. Consequently, the busbar and the exposed surface can be reliably melted with a laser beam and strongly weld-joined to each other.

In the battery system of the present invention, the busbar can be welded to the welding surface of the electrode terminal by the fillet weld part and the penetration weld part by scanning of laser focused on a spot having a predetermined size.

In the battery system of the present invention, the exposure gap can be made to be larger than 1 mm.

In the above-mentioned battery system, since the exposure gap is larger than 1 mm, the position of the exposed surface can be reliably detected, and the busbar can be reliably and stably laser-welded to the exposed surface by the fillet weld part.

In the battery system of the present invention, the busbar includes a pair of welding plate portions welded to the electrode terminals and the linking portion that links the pair of welding plate portions to each other. A thickness of the linking portion can be made larger than that of the welding plate portion.

The above-mentioned battery system has a feature that the welding plate portion can be reliably and stably weld-joined to the exposed surface of the electrode terminal, while the electrical resistance of the busbar can be reduced. This is because the welding plate portion can be allowed to have a thickness suitable for laser welding, and at the same time, the electrical resistance can be reduced by increasing a thickness of an electrically connecting portion.

In the battery system of the present invention, the busbar includes a pair of welding plate portions welded to the electrode terminals, and the linking portion that links the pair of welding plate portions. The linking portion can include a U-curved portion that is U-curved in the middle.

Since the above-mentioned battery system is provided with the U-curved portion in the linking portion, the U-curved portion absorbs a relative positional displacement between the pair of electrode terminals that link the pair of welding plate portions, so that excessive stress acting on the electrode terminals or the welding portion can be reduced.

In the battery system of the present invention, the linking portion includes a first connection portion and a second connection portion at both end parts of the busbar and each having the welding plate portion; a first rising portion and a second rising portion coupled to the first connection portion and the second connection portion via bent portions, respectively; and a middle linking portion having both ends coupled to the first rising portion and the second rising portion via bent portions, respectively. The middle linking portion can be provided with the U-curved portion.

The above-mentioned battery system can reliably prevent excessive stress from acting on the electrode terminal or the melted part by absorbing a dimensional relative position of battery cells by the U-curved portion as well as the rising portion and the bent portion. Therefore, even when the battery cells to which the welding plate portions of the busbar are coupled are displaced in the X axial direction, the Y axial direction, and the Z axial direction, excessive stress acting on the electrode terminals of the battery cells or the welding portion can be remarkably reduced.

In the battery system of the present invention, a width of the U-curved portion can be narrower than that of the first connection portion or the second connection portion. In the above-mentioned battery system, the U-curved portion can be easily deformed, and displacement of the battery cells can be effectively absorbed more efficiently. Thus, it is possible to reduce excessive stress acting on the electrode terminals of the battery cells or the welding portion.

DETAILED DESCRIPTION OF THE PREFERRED EMBODIMENT

Hereinafter, exemplary embodiments of the present invention are described with reference to the drawings. The exemplary embodiments described below are illustrations of a battery system to give a concrete form to technical ideas of the present invention. The present invention is not specifically limited to a battery system described below. Furthermore, it should be appreciated that the members shown in claims are not specifically limited to members in the exemplary embodiments.

The battery system of the present invention is used for various applications, for example, a power source installed in an electric-powered vehicle such as a hybrid car or an electric automobile to supply electric power to a driving motor, a power source for storing natural energy power generated, by for example, solar power and wind power, a power source for storing late-night electric power, or the like, and in particular, is used as a power source suitable for applications for large electric power and a large current.

Figure 1:
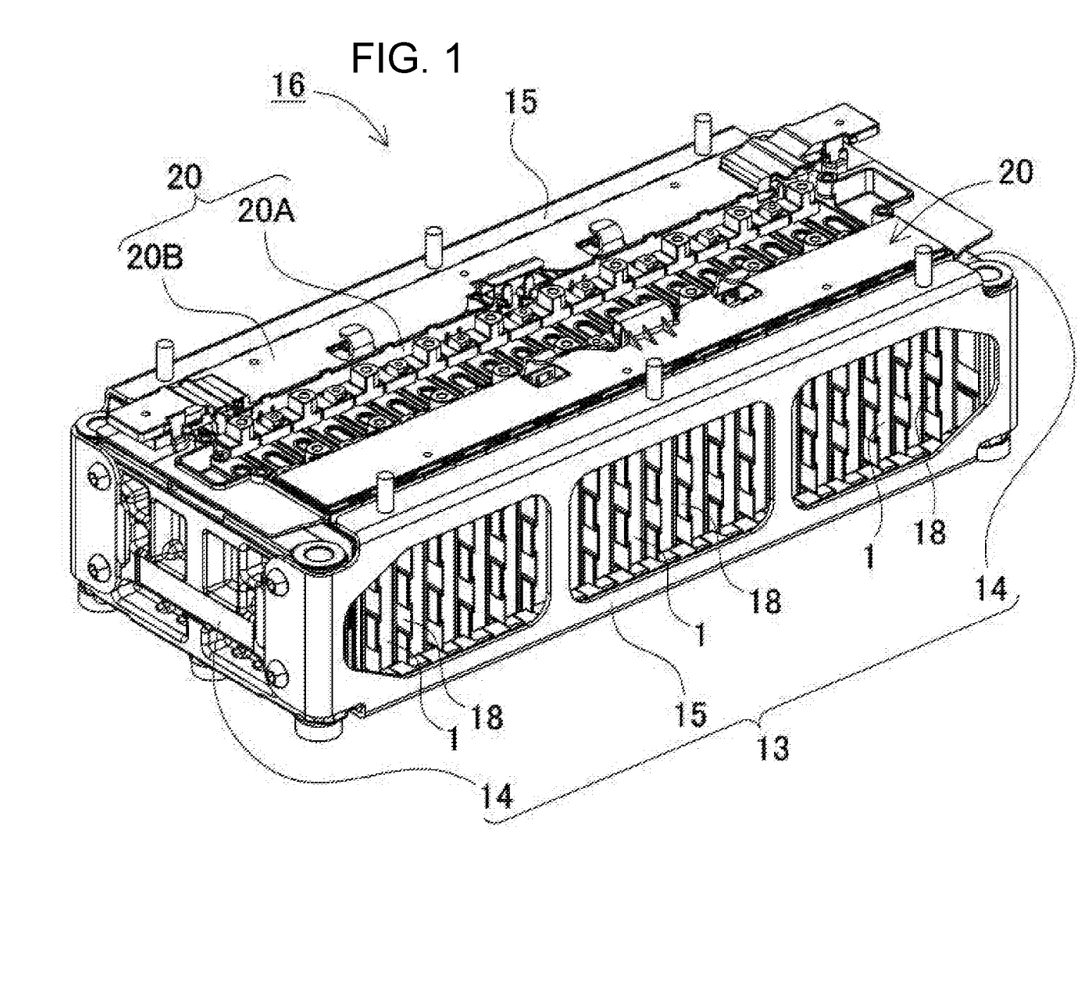
FIG. 1 is a perspective view of a battery system in accordance with one exemplary embodiment.

A battery system shown in FIG. 1 includes a plurality of battery cells 1 that are fixed in a state in which battery cells 1 are stacked with insulating separators 18 sandwiched therebetween. Each battery cell 1 is a rectangular battery. Furthermore, each battery cell 1 is a rectangular battery including a lithium ion battery. However, in the battery system of the present invention, battery cell 1 is not particularly limited to a rectangular battery, and not particularly limited to lithium ion secondary battery. As the battery cell 1, any chargeable batteries, for example, nonaqueous electrolyte secondary battery cells other than lithium ion secondary battery cell, a nickel hydride battery cell can be used.

Figure 2:
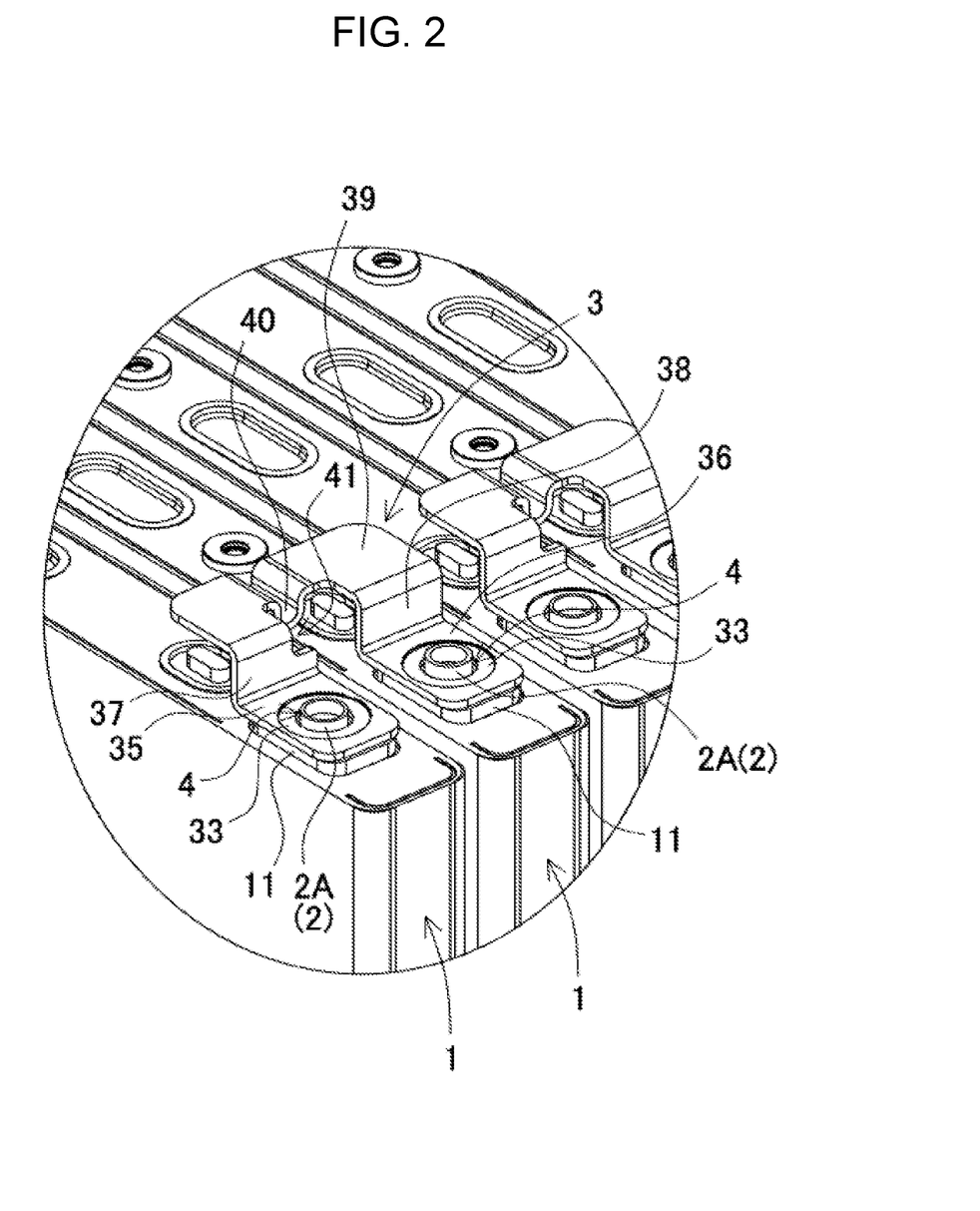
FIG. 2 is a schematic perspective view showing a link structure between battery cells and busbars of the battery system shown in FIG. 1.
Figure 3:
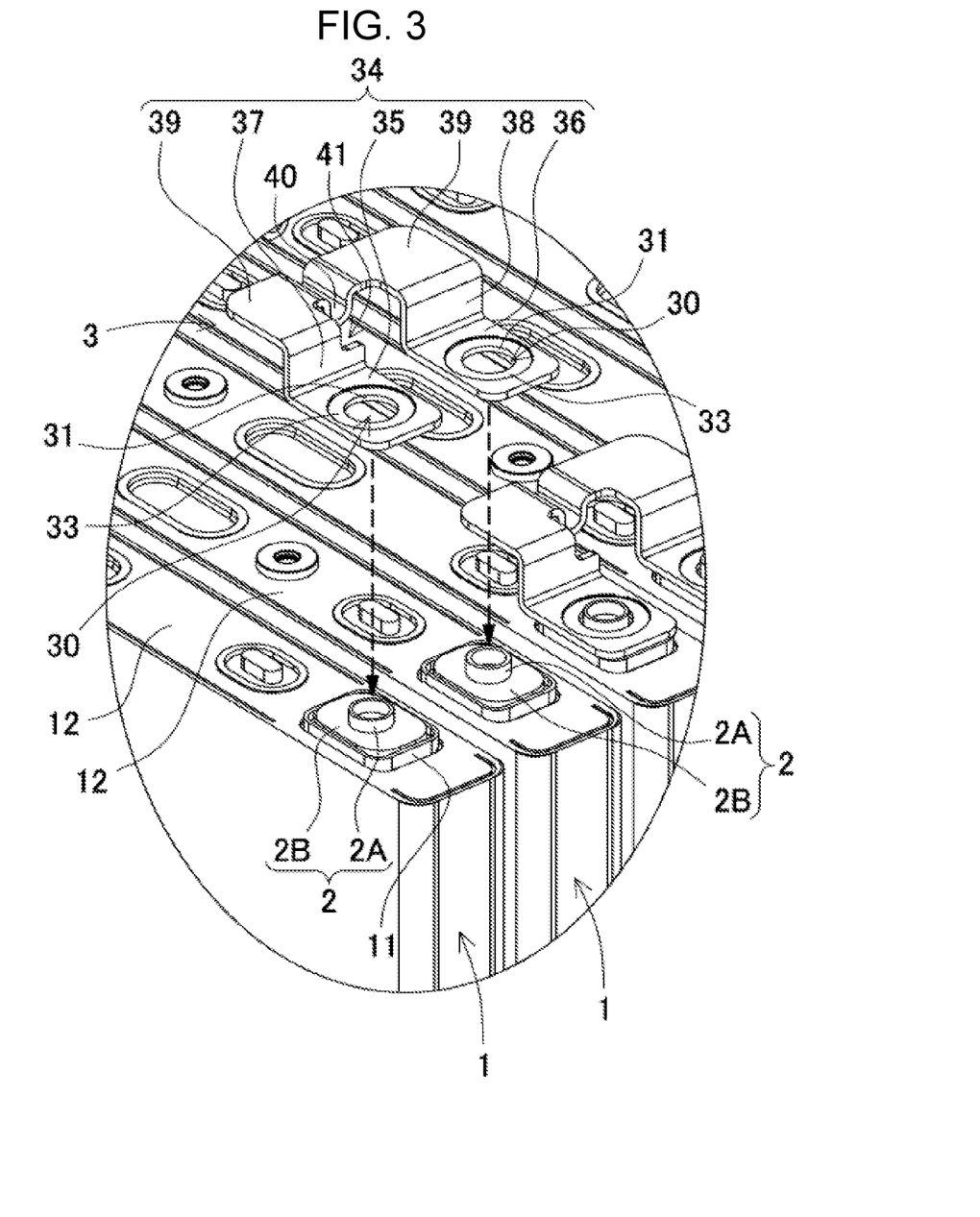
FIG. 3 is an exploded perspective view showing the link structure between the battery cells and the busbars of the battery system shown in FIG. 2.

In the rectangular battery, positive and negative electrode terminals 2 are fixed to sealing plate 12 via insulating material 11 as shown in FIGS. 2 and 3. Note here that in order to easily understand a connection state between battery cell 1 and busbar 3, FIGS. 2 and 3 do not show insulating separator 18 stacked between the plurality of battery cells 1 and busbar holder 20 for disposing a plurality of busbars 3 in predetermined positions (details are described later). Positive and negative electrode terminals 2 each include protruding portion 2A and welding surface 2B provided around protruding portion 2A. Welding surface 2B is a plane in parallel to the surface of sealing plate 12. Welding surface 2B has protruding portion 2A in a middle of welding surface 2B. Electrode terminal 2 shown in the drawings has columnar protruding portion 2A. The protruding portion is not necessarily limited to a columnar-shape, and may be a polygonal or elliptic cylinder shape although not shown.

The plurality of stacked battery cells 1 are fixed to a predetermined position by fixing component 13 to form a rectangular parallelepiped battery block 16. Fixing component 13 includes a pair of end plates 14 and fastening member 15. End plates 14 are disposed at both end surfaces of stacked battery cells 1, and fastening member 15 is coupled at the end parts thereof and fixes stacked battery cells 1 in a state in which pressure is applied.

In battery block 16, battery cells 1 are stacked such that the surfaces having electrode terminals 2 of battery cells 1, that is, sealing plates 12 in the drawings are flush with each other. The battery systems of FIGS. 1 and 2 have positive and negative electrode terminals 2 on the upper surface of battery block 16. In battery block 16, battery cells 1 are stacked in a state in which the directions of the positive and negative electrode terminals 2 on both of the end parts of sealing plate 12 are opposite in the right and left directions. In battery block 16, as shown in the drawings, on both of the sides of battery block 16, adjacent electrode terminals 2 are linked to each other using metal plate busbar 3 and battery cells 1 are connected in series.

Busbar 3 has both end parts connected to the positive and negative electrode terminals 2 so as to connect battery cells 1 in series or in parallel. In the battery system, battery cells 1 can be connected in series to increase an output voltage, and in series and in parallel to increase an output voltage and an output electrical current.

Busbar 3 is provided with cut-away portion 30 into which protruding portion 2A of electrode terminal 2 is to be inserted. Busbar 3 of FIGS. 2 and 3 has cut-away portions 30 on both end parts. Protruding portions 2A of electrode terminals 2 of battery cells 1, which are arranged adjacent to each other, are guided to cut-away portions 30, respectively. Busbar 3 of FIGS. 2 and 3 has cut-away portion 30 as a through-hole into which protruding portion 2A is inserted.

Cut-away portion 30 has an inner shape in which protruding portion 2A of electrode terminal 2 can be guided. In addition, exposure gap 4 is provided between the inner edge of cut-away portion 30 and protruding portion 2A in a state in which protruding portion 2A is guided. Thus, welding surface 2B of electrode terminal 2 is exposed in a state in which protruding portion 2A is guided into cut-away portion 30.

In cut-away portion 30 having exposure gap 4, to the inner side thereof, protruding portion 2A is not closely attached. The inner edge of cut-away portion 30 is irradiated with a laser beam so as to melt the inner edge, and welding surface 2B of electrode terminal 2 can be welded reliably. Consequently, welding to welding surface 2B of electrode terminal 2 can be carried out reliably with the inner edge of cut-away portion 30 as fillet weld part 31. Furthermore, in a step of laser-welding busbar 3 to electrode terminals 2, a laser beam or a position-detection sensor is inserted into exposure gap 4, so that a position of welding surface 2B can be detected. When the position of welding surface 2B can be detected, a position of the surface of busbar 3 can be detected by the laser beam or the position-detection sensor, so that it is possible to determine whether busbar 3 is attached closely to welding surface 2B. In a step of laser-welding busbar 3 to electrode terminal 2, when there is a gap between busbar 3 and welding surface 2B, reliable laser welding cannot be secured. The position of welding surface 2B is detected and further the position of busbar 3 is detected, so that an interval between busbar 3 and welding surface 2B can be detected. In the laser welding step, when it is detected that busbar 3 is closely attached to welding surface 2B and laser welding is carried out, busbar 3 can be reliably laser-welded to welding surface 2B. When there is a gap between busbar 3 and welding surface 2B, laser welding is stopped, and busbar 3 is pressed to be closely attached to welding surface 2B, or busbar 3 is exchanged and closely attached to welding surface 2B. Thus, laser-welded busbar 3 can be welded to electrode terminal 2 reliably.

Exposure gap 4 is preferably more than 1 mm, and more preferably 2 mm or more. Exposure gap 4 having this interval makes it possible to irradiate welding surface 2B with a laser beam, or to insert the position-detection sensor to reliably detect the position of welding surface 2B. Furthermore, the inner edge of cut-away portion 30 can be irradiated with a laser beam and fillet weld part 31 can be laser-welded to welding surface 2B reliably.

Busbar 3 of FIGS. 2 and 3 has cut-away portion 30 as a through-hole. Furthermore, the through-hole is formed in a circular shape whose inner shape is made larger than the outer shape of protruding portion 2A, and exposure gap 4 is provided between busbar 3 and protruding portion 2A. In a link structure in which columnar protruding portion 2A is inserted into cut-away portion 30 as a circular through-hole, the inner edge of the through-hole is welded to welding surface 2B by fillet weld part 31, as shown in FIG. 4, busbar 3 can be reliably welded to welding surface 2B by fillet weld part 31 and penetration weld part 32 by irradiation with a focused laser beam in a circular locus.

Figure 4:
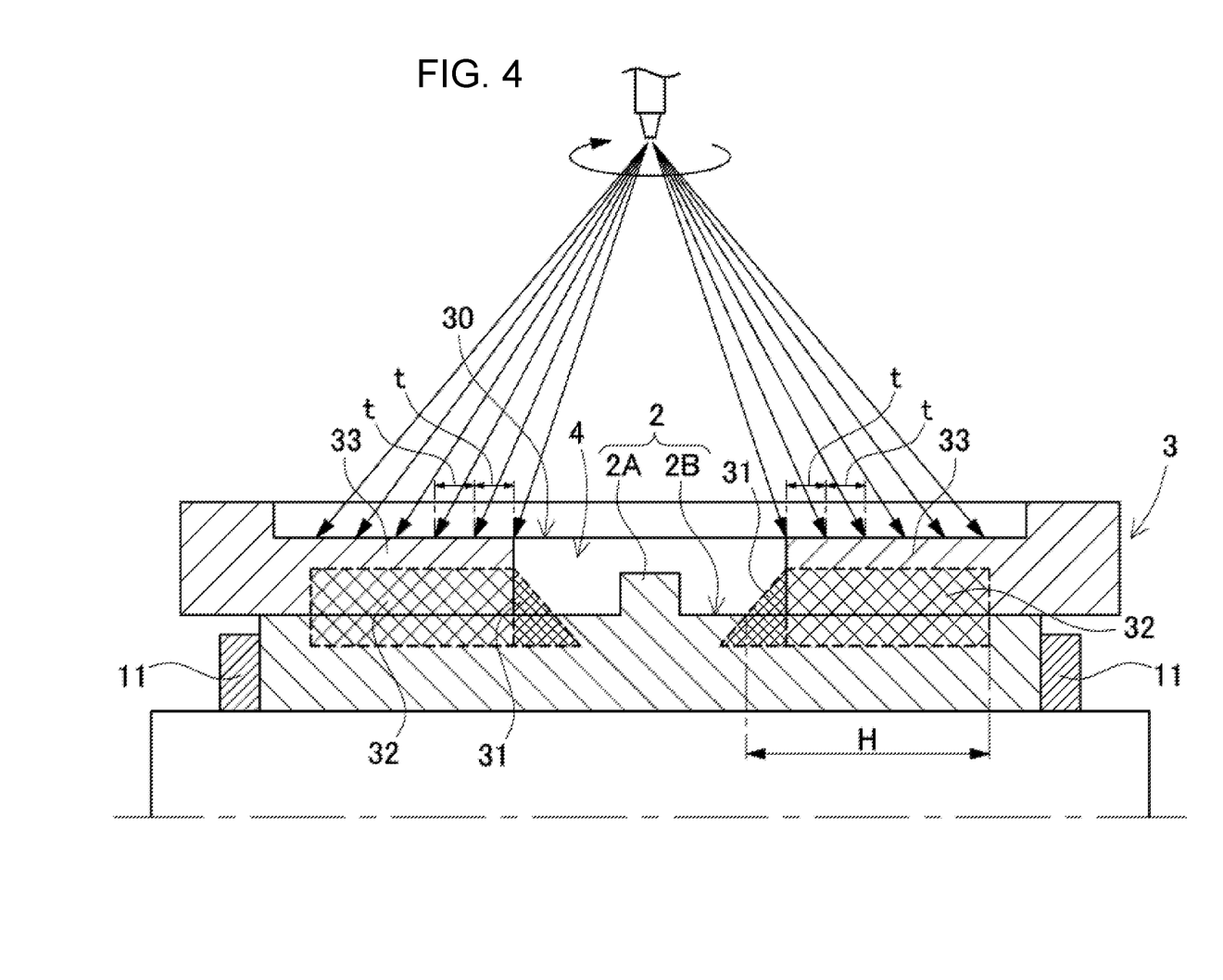
FIG. 4 is a schematic enlarged sectional view showing the link structure between an electrode terminal of a battery cell and a busbar.

As shown in FIG. 4, busbar 3 is welded to welding surface 2B by fillet weld part 31 that welds the inner edge of cut-away portion 30 to welding surface 2B and by penetration weld part 32 that welds the boundary with respect to welding surface 2B of electrode terminal 2. Busbar 3 is welded to welding surface 2B in a predetermined welding width (H) by fillet weld part 31 and penetration weld part 32. In order to weld busbar 3 to electrode terminals 2 with sufficient strength, the welding width (H) is, for example, 0.8 mm or more, preferably 1 mm or more, and further preferably 1.2 mm or more. When the welding width (H) is increased, the welding strength can be increased, but it takes a long time to carry out welding. Therefore, the welding width (H) is, for example, 5 mm or less, preferably 4 mm or less, and further preferably 3 mm or less.

Busbar 3 is welded to welding surface 2B of electrode terminal 2 in a predetermined welding width (H) by fillet weld part 31 and penetration weld part 32 by irradiation with a laser beam, focused on a predetermined radius, at a predetermined pitch (t) in a plurality of lines. Busbar 3 is welded to welding surface 2B by fillet weld part 31 by irradiation with a laser beam applied in a plurality of lines along the inner edge of cut-away portion 30. Thereafter, irradiation is carried out by displacing the irradiation positions of laser beam at a predetermined pitch (t), and busbar 3 is welded to welding surface 2B by penetration weld part 32. The laser beam, which is irradiated in a plurality of lines and with which busbar 3 is welded to welding surface 2B by fillet weld part 31 and penetration weld part 32, is focused on a narrow area, and the busbar 3 is irradiated with the focused laser beam. The focused laser beam is focused on an area that is substantially equal to or larger than the pitch (t) of irradiation carried out in the plurality of lines. The laser beam which is focused on an area larger than the pitch (t) is irradiated in a plurality of lines, so that busbar 3 can be welded uniformly welded to welding surface 2B in a predetermined welding width (H).

The laser beam irradiated at a predetermined pitch (t) in a plurality of lines is irradiated, for example, in three lines or more, preferably in five lines or more, and more preferably ten lines or more, so that busbar 3 can be reliably welded to welding surface 2B by fillet weld part 31 and penetration weld part 32. With a welding structure in which busbar 3 is welded by fillet weld part 31 and penetration weld part 32 by irradiation with a laser beam at a predetermined pitch (t) in a plurality of lines, busbar 3 can be welded to welding surface 2B reliably. Also, by increasing an area into which a laser beam is converged, busbar 3 can be welded to welding surface 2B by both fillet weld part 31 and penetration weld part 32. This laser beam is adjusted to energy capable of reliably welding busbar 3 to welding surface 2B by fillet weld part 31 and penetration weld part 32.

Figure 5:
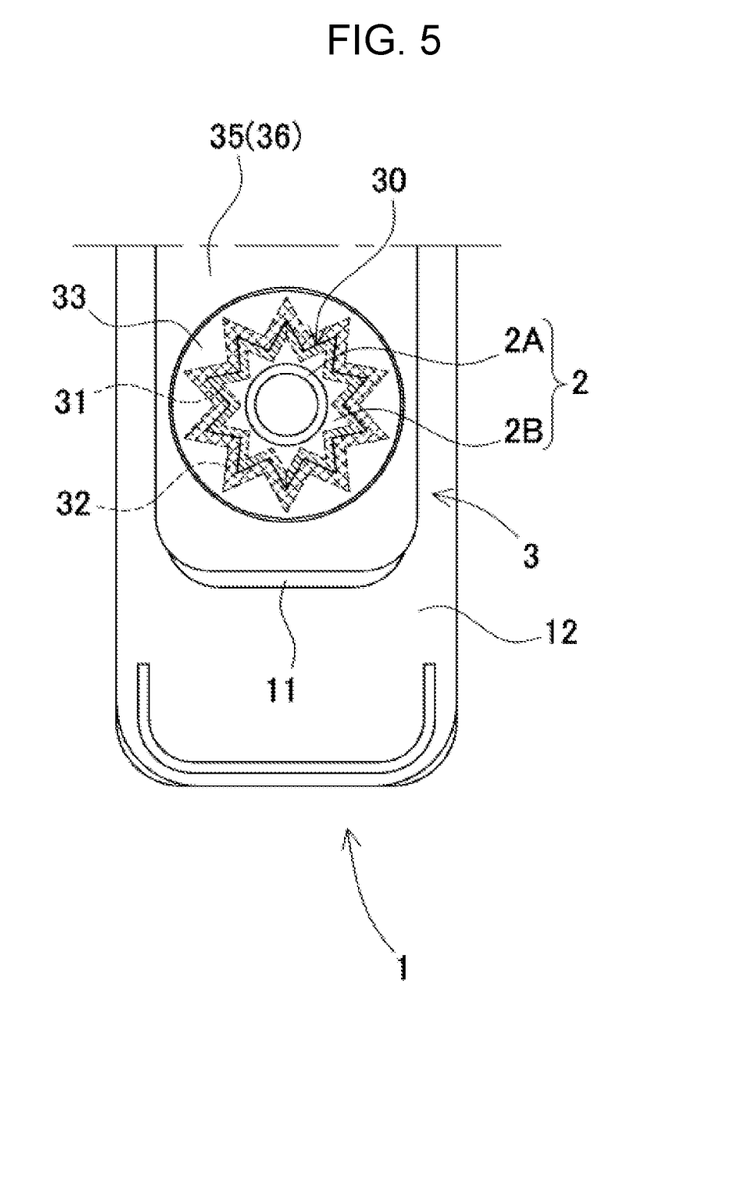
FIG. 5 is an enlarged plan view showing another example of a busbar.

Busbar 3 of FIG. 5 has cut-away portion 30 as a star-shaped through-hole, and the inner edge of the through-hole is welded to welding surface 2B by fillet weld part 31 and the outer side is welded to welding surface 2B as penetration weld part 32. This welding structure enables busbar 3 to be fixed to welding surface 2B strongly. Furthermore, busbar 3 of FIG. 6 has cut-away portion 30 as a concave or recess portion, and the inner edge of the recess portion is welded to welding surface 2B by fillet weld part 31, and the outer side of fillet weld part 31 is welded to welding surface 2B as penetration weld part 32.

Busbars 3 are disposed in the predetermined positions by busbar holder 20 shown in FIG. 1. Protruding portions 2A of electrode terminals 2 are guided to cut-away portions 30. Busbar holder 20 is molded by an insulating material such as plastic, and disposes busbars 3 in the predetermined positions by fitting structures. Busbar holder 20 is linked to battery block 16, and disposes busbars 3 to the predetermined positions. Busbar holder 20 is linked to insulating separators 18 stacked between rectangular batteries and disposed to the predetermined positions, or linked to the rectangular batteries and linked to the predetermined positions of battery block 16. Busbar holder 20 shown in FIG. 1 is provided with frame-shaped holder main body 20A for disposing a plurality of busbars 3 to the predetermined positions and cover plate 20B for closing the upper opening of holder main body 20A. Holder main body 20A is disposed in the upper surface of battery block 16 in a state in which a plurality of busbars 3 are fixed to the predetermined positions, and cut-away portion 30 of each busbar 3 is disposed to protruding portion 2A of electrode terminal 2. Furthermore, in this state, busbars 3 are weld-joined to electrode terminals 2 by irradiation with a laser beam from the upper opening of holder main body 20A. After all busbars 3 are weld-joined to electrode terminals 2, the upper opening of holder main body 20A is covered with the cover plate 20B.

Busbar 3 of FIGS. 2 and 3 includes a pair of welding plate portions 33 welded and coupled to electrode terminals 2, and linking portion 34 linking the pair of welding plate portions 33. A thickness of linking portion 34 is larger than that of welding plate portion 33. Busbar 3 of FIG. 4 is provided with welding plate portion 33 in the vicinity of cut-away portion 30 and in a part that is laser-welded to welding surface 2B by fillet weld part 31 and penetration weld part 32. In busbar 3 of FIG. 3, cut-away portion 30 is a circular through-hole, and, therefore, circular welding plate portion 33 is provided in the vicinity of the through-hole. Since welding plate portion 33 is laser-welded to welding surface 2B, it has larger width than welding width (H) at which it is welded to welding surface 2B by fillet weld part 31 and penetration weld part 32.

Welding plate portion 33 has a thickness that can be reliably laser-welded to welding surface 2B of electrode terminal 2. A thickness of welding plate portion 33 is set at a dimension that enables reliable welding both fillet weld part 31 and penetration weld part 32 to be welded to welding surface 2B with a laser beam irradiated to the surface of welding plate portion 33 as shown in the sectional view of FIG. 4. The thickness of welding plate portion 33 is, for example, 0.3 mm or more, and preferably 0.4 mm or more. When the thickness is too large, it is necessary to increase energy for laser-welding penetration weld part 32 to welding surface 2B. Therefore, the thickness of welding plate portion 33 is set at, for example, 2 mm or less, and preferably 1.6 mm or less.

Linking portion 34 of busbar 3 of FIGS. 2 and 3 includes first connection portion 35 and second connection portion 36 provided at both end parts; first rising portion 37 and second rising portion 38 coupled to first connection portion 35 and second connection portion 36 via bent portions, respectively; and middle linking portion 39 coupled to first rising portion 37 and second rising portion 38 via bent portions, respectively. First connection portion 35 and second connection portion 36 are provided with welding plate portion 33 at the inner side. First rising portion 37 and second rising portion 38 are coupled to first connection portion 35 and second connection portion 36 and disposed in a vertical orientation via bent portions bent at a right angle, with a predetermined radius of curvature. Middle linking portion 39 is coupled to first rising portion 37 and second rising portion 38 and disposed in a horizontal orientation via a bent portion that is bent at a right angle, with a predetermined radius of curvature. Middle linking portion 39 is provided with U-curved portion 40 in the middle portion thereof. In middle linking portion 39, the width of U-curved portion 40 is narrower than the width of first connection portion 35 and second connection portion 36 and made to be easily deformed. Busbar 3 of FIG. 3 is provided with cut-away recess portion 41 in the vicinity of the bent portion that links first rising portion 37 and middle linking portion 39, and the width of U-curved portion 40 is made to be narrower. This busbar 3 is formed by linking two metals having different electrical resistance, and is provided with cut-away recess portion 41 in a bent portion made of metal having smaller electrical resistance, to prevent the electrical resistance from being increased by cut-away recess portion 41. For example, in busbar 3 in which first connection portion 35, first rising portion 37 and one end of middle linking portion 39 are formed of a copper plate, and second connection portion 36, second rising portion 38 and the other end of middle linking portion 39 are formed of an aluminum plate, a cut-away recess portion is provided in the vicinity of the bent portion as the copper plate, and the width of U-curved portion 40 can be reduced and easily deformed while increase in the electrical resistance of busbar 3 is reduced.

In the above-mentioned battery system, electrode terminals 2 are connected to busbar 3 by the following steps.

(1) Busbar holder 20 in which a plurality of busbars 3 are arranged in the predetermined positions is disposed in the predetermined position of battery block 16. Protruding portion 2A of electrode terminal 2 is guided to cut-away portion 30 of busbar 3.

(2) Welding surface 2B is irradiated with a laser beam from exposure gap 4 so as to detect the position of welding surface 2B, and further the surface of busbar 3 is irradiated with a laser beam so as to detect the position of busbar 3, for determining whether or not busbar 3 is brought into contact with welding surface 2B. When it is determined that busbar 3 is in contact with welding surface 2B, the step proceeds to the next step.

When busbar 3 is apart from welding surface 2B by a set value, an error message is displayed. When the error message is displayed, busbar 3 is exchanged or a position of busbar 3 is adjusted, so that busbar 3 is brought into contact with welding surface 2B.

(3) A position of the inner edge of cut-away portion 30 of busbar 3 is pattern-recognized in a state in which busbar 3 is brought into contact with welding surface 2B; the inner edge of cut-away portion 30 is irradiated with a laser beam; the inner edge of cut-away portion 30 as fillet weld part 31 is laser-welded; a position that is apart from fillet weld part 31 at a predetermined pitch is irradiated with a plurality of lines of laser beams along fillet weld part 31; busbar 3 is welded to welding surface 2B in a predetermined width, and welded as penetration weld part 32. As shown in FIG. 3, busbar 3 having cut-away portion 30 as a circular through-hole is irradiated with a laser beam along the inner diameter of the through-hole as shown in FIG. 4, is welded to welding surface 2B using the inner edge of the through-hole as fillet weld part 31, and then irradiated with a laser beam and welded to welding surface 2B as penetration weld part 32 while a radius irradiated with a laser beam at the predetermined pitch is increased. Welding portions of fillet weld part 31 and penetration weld part 32 are continuous. Welding plate portion 33 of busbar 3 is welded to welding surface 2B by fillet weld part 31 and the penetration weld part 32 in a predetermined width.

Figure 6:
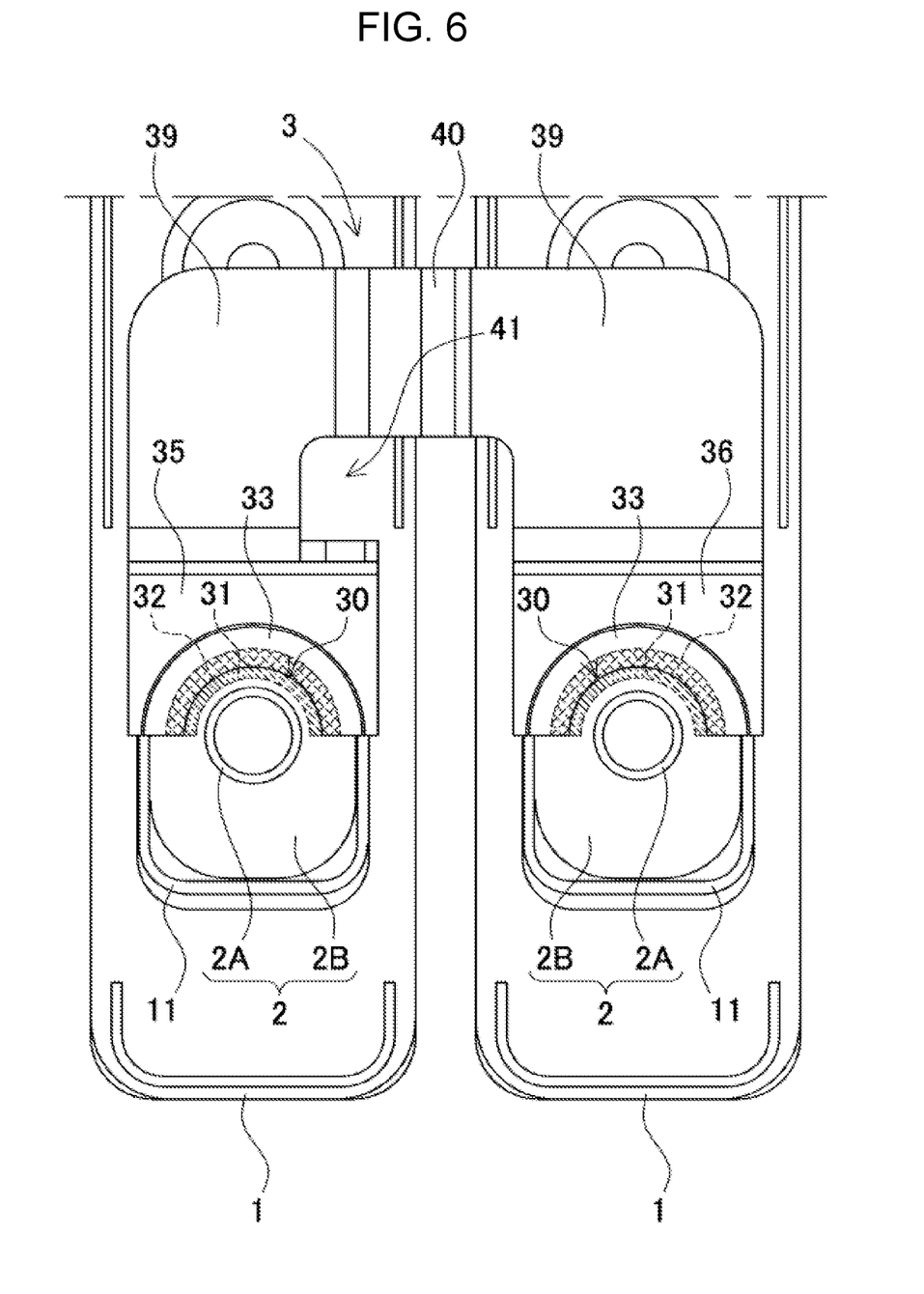
FIG. 6 is an enlarged plan view showing still another example of a busbar.

In busbar 3 of FIG. 3, since cut-away portion 30 is a circular through-hole, both fillet weld part 31 and penetration weld part 32 are formed in a ring shape. However, as shown in FIG. 6, in busbar 3 having semicircular cut-away portion 30, fillet weld part 31 and penetration weld part 32 are formed in a semicircular-shape, and welding plate portion 33 of busbar 3 is welded to welding surface 2B in a predetermined width.

In a battery system of the present invention, electrode terminals of battery cells and a busbar are electrically connected reliably and stably. Thereby, the battery system can be suitably used for power sources of electric-powered vehicles or power sources for storing natural energy or late-night power.

The invention claimed is:

1. A battery system comprising:
    a plurality of battery cells each having electrode terminals fixed to a sealing plate, and
    a busbar laser-welded to the electrode terminals of the battery cells and electrically connecting the battery cells,
    wherein
    each of the battery cells includes an electrode terminal having a welding surface, the welding surface being a plane in parallel to a surface of the sealing plate and being provided around a protruding portion, the protruding portion protruding from the welding surface;
    the busbar includes a welding plate portion that is brought into surface-contact with the welding surface of the electrode terminal, and the welding plate portion is provided with a cut-away portion for receiving the protruding portion in an inner side of the cut-away portion;
    an exposure gap that exposes the welding surface is provided between the inner side of the cut-away portion and the protruding portion;
    the busbar is welded by a fillet weld part that welds an inner edge of the cut-away portion to the welding surface of the electrode terminal and a penetration weld part that welds a boundary between the busbar and the welding surface of the electrode terminal, and the busbar is welded to the electrode terminal in a predetermined welding width by both the fillet weld part and the penetration weld part;
    the protruding portion is not welded to the busbar, and an exposure surface of the terminal is interposed between the fillet weld part and the protruding portion; and
    the exposure surface and the welding surface are on the same plane, and the fillet weld part is not in contact with the protruding portion.

2. The battery system according to claim 1, wherein the cut-away portion is a through-hole provided in the busbar.

3. The battery system according to claim 1, wherein the busbar is welded to the welding surface of the electrode terminal in the predetermined welding width by the fillet weld part and the penetration weld part by laser-welding at a predetermined pitch in a plurality of lines.

4. The battery system according to claim 1, wherein the busbar is welded to the welding surface of the electrode terminal by the fillet weld part and the penetration weld part by scanning of laser focused on a spot having a predetermined size.

5. The battery system according to claim 1, wherein the exposure gap is larger than 1 mm.

6. The battery system according to claim 1, wherein the busbar includes a pair of welding plate portions each welded to the electrode terminal, and a linking portion that links the pair of welding plate portions to each other, and a thickness of the linking portion is larger than a thickness of each of the welding plate portions.

7. The battery system according to claim 6, wherein the busbar includes the pair of welding plate portions each welded to the electrode terminal, and the linking portion that links the pair of welding plate portions to each other, and wherein the linking portion includes a U-curved portion that is U-curved in a middle.

8. The battery system according to claim 7, wherein
    the linking portion includes a first connection portion and a second connection portion provided at both end parts of the busbar and each having the welding plate portion; a first rising portion and a second rising portion coupled to the first connection portion and the second connection portion via bent portions, respectively; and a middle linking portion having both ends coupled to the first rising portion and the second rising portion via bent portions, respectively, and
    the middle linking portion includes the U-curved portion.

9. The battery system according to claim 8, wherein a width of the U-curved portion is narrower than a width of the first connection portion or the second connection portion.

* * * * *